(12) United States Patent
Hariharan et al.

(10) Patent No.: US 8,396,750 B1
(45) Date of Patent: Mar. 12, 2013

(54) METHOD AND SYSTEM FOR USING RECOMMENDATIONS TO PROMPT SELLER IMPROVEMENT

(75) Inventors: Gurushyam Hariharan, Phoenix, AZ (US); Matthew T. Williams, Seattle, WA (US); Guray Alsac, Tempe, AZ (US)

(73) Assignee: Amazon Technologies, Inc., Reno, NV (US)

( * ) Notice: Subject to any disclaimer, the term of this patent is extended or adjusted under 35 U.S.C. 154(b) by 376 days.

(21) Appl. No.: 12/485,248

(22) Filed: Jun. 16, 2009

(51) Int. Cl.
*G06Q 30/00* (2012.01)

(52) U.S. Cl. .................................................. 705/26.1

(58) Field of Classification Search .............. 705/26.1, 705/27.1
See application file for complete search history.

(56) References Cited

U.S. PATENT DOCUMENTS

| | | | | |
|---|---|---|---|---|
| 5,968,125 | A * | 10/1999 | Garrick et al. | 709/224 |
| 6,385,590 | B1 * | 5/2002 | Levine | 705/7.32 |
| 6,477,575 | B1 * | 11/2002 | Koeppel et al. | 709/224 |
| 2001/0013009 | A1 * | 8/2001 | Greening et al. | 705/10 |
| 2002/0123922 | A1 * | 9/2002 | Poage et al. | 705/10 |
| 2002/0156799 | A1 * | 10/2002 | Markel et al. | 707/202 |
| 2002/0186237 | A1 * | 12/2002 | Bradley et al. | 345/736 |
| 2003/0154442 | A1 * | 8/2003 | Papierniak | 715/501.1 |
| 2004/0176992 | A1 * | 9/2004 | Santos et al. | 705/10 |
| 2004/0177326 | A1 * | 9/2004 | Bibko et al. | 715/530 |
| 2005/0262240 | A1 * | 11/2005 | Drees et al. | 709/224 |
| 2005/0288994 | A1 * | 12/2005 | Haunschild | 705/11 |
| 2006/0253345 | A1 * | 11/2006 | Heber | 705/27 |
| 2006/0277087 | A1 * | 12/2006 | Error | 705/8 |
| 2006/0277250 | A1 * | 12/2006 | Cherry et al. | 709/203 |
| 2008/0133500 | A1 * | 6/2008 | Edwards et al. | 707/5 |
| 2008/0275980 | A1 * | 11/2008 | Hansen | 709/224 |
| 2009/0006478 | A1 * | 1/2009 | Rikhtverchik et al. | 707/104.1 |
| 2010/0174671 | A1 * | 7/2010 | Brooks et al. | 706/12 |

OTHER PUBLICATIONS

Mar. 2006—http://web.archive.org/web/20060313034254/http://www.hisoftware.com/products/access_101.htm.*

* cited by examiner

*Primary Examiner* — Matthew Zimmerman
(74) *Attorney, Agent, or Firm* — Thomas | Horstemeyer, LLP (57) ABSTRACT

Disclosed are various embodiments for recommending improvements in merchant network sites. In one example, a plurality of recommendations are stored in a memory accessible by a server, the recommendations being applicable to improve an operation of the network presence of at least one of a plurality of online merchants, and wherein a criteria is associated with each of the recommendations, each criteria determining whether a corresponding one of the recommendations applies to the network presence of a respective one of the online merchants. A subset of the recommendations applicable to the network presence of one of the online merchants is identified and an implementation status is determined for each of the subset of recommendations. The recommendations in the subset are presented along with the implementation status of each of the recommendations to an agent of the one of the online merchants.

25 Claims, 8 Drawing Sheets

FIG. 1

Seller Improvement Dashboard

| | | | |
|---|---|---|---|
| Manage Design | ⓘ Action Required | • Add Company Logo | ☐ Enable Auto Implementation |
| Manage Domain Name | ✓ OK | • Domain name secured | Suggested Action: Add a company logo to establish trust with your customers by presenting your distinct branding on your network store. To do this, go to the template manager and click to edit the default company logo image widget to use a different image. |
| Add Inventory | ✓ OK | • Inventory levels adequate | |
| Product Offering Adjustment | ⓘ Action Required | • Potential affiliations to add<br>• Products to eliminate | |
| Manage Categories | ⓘ Action Required | • Assign categories to 5 products | View Illustration of Potential Impact of Implementation |
| Increase Traffic/ Sales | ✓ OK | • Website tracking activated | View Impact of Implemented Recommendation |
| Search Keywords | ⓘ Action Required | • Add keywords to 3 products | View Customer Feedback |

Network Site Survey — 179c

Please indicate your agreement with the below statements as they relate to this network site by adjusting the slide bar next to each statement.

Site: www.productsales.com

0% (Disagree)            100% (Agree)

I trust this website.                                                   42%

It was easy to navigate through the pages of this network site.  75%

I like the appearance of this network site.                   75%

253↗            256↗

Submit — 259

Survey Results for www.productsales.com — 179d

The results from surveys soliciting feedback for your network site are set forth below.

Site: www.productsales.com

|  | www.productsales.com | Average |
|---|---|---|
| I trust this website. | 42% | 53% |
| It was easy to navigate through the pages of this network site. | 75% | 62% |
| I like the appearance of this network site. | 75% | 85% |

Product Selection Alteration Suggestions — 179e

Below are suggested changes to your product selection based on commercial intelligence.

Affinity Products to Add

| Primary Product | We suggest you add the following Affinity Product(s) | % who purchased Affinity Product with Primary Product |
|---|---|---|
| Widget | Widgetese | 15% |
|  | Widget Stand | 23% |
|  | Widget Cords | 18% |

303    306

Product to Discontinue

Extrawidget
Widgetnutz     309

METHOD AND SYSTEM FOR USING RECOMMENDATIONS TO PROMPT SELLER IMPROVEMENT

BACKGROUND

Various online entities such as GOOGLE™ or YAHOO® facilitate marketplaces in which multiple sellers may offer products to consumers. Many of the sellers that list products may operate their enterprises in a manner that ultimately reduces their profitability due to a lack of knowledge and experience as to how to run an online enterprise.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The following discussion describes systems and methods relating to the generation of recommendations to prompt seller improvement in an online marketplace according to various embodiments. For the sake of convenience, first a data communications network 100 is described, followed by a discussion of the operation of the various components of the data communications network 100 according to various embodiments.

Figure 1:
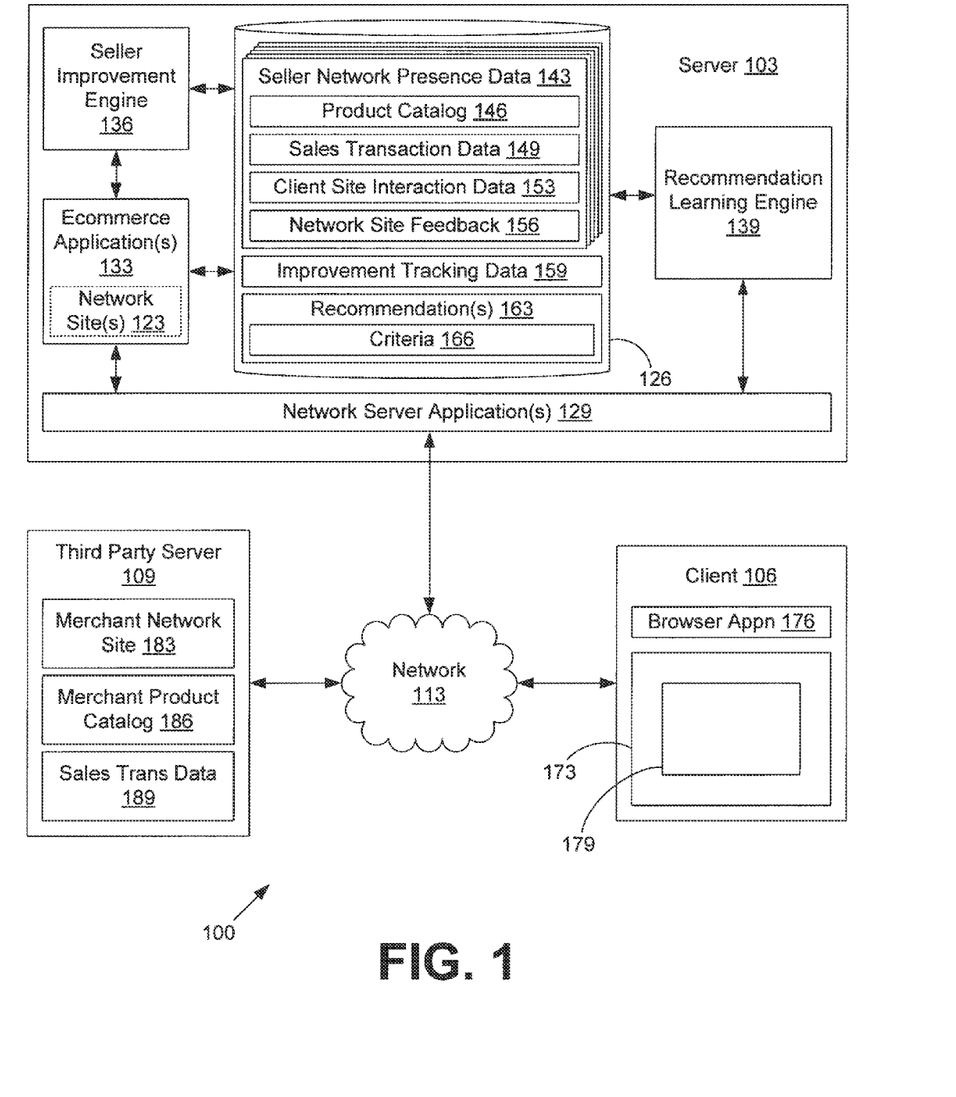
FIG. 1 is a drawing of one example of a data communications network according to an embodiment of the present disclosure.

With reference to FIG. 1, shown is an example of a data communications network 100 that includes one or more servers 103, one or more clients 106, and one or more third party servers 109 that are coupled to a network 113. The network 113 may comprise, for example, the Internet, intranets, extranets, wide area networks (WANs), local area networks (LANs), wired networks, wireless networks, or other suitable networks, etc., or any combination of two or more such networks. For purposes of convenience, the one or more servers 103, one or more clients 106, and one or more third party servers 109 are referred to herein in the singular. However, it is understood that in one embodiment, the server 103 and the third party server 109 each may represent a plurality of servers, and the client 106 may represent a plurality of clients.

The server 103 is employed to execute various applications that provide for the generation of recommendations for the network presence of online merchants as will be described. As contemplated herein, the terms "network presence" refer to the online existence of an online merchant through which products may be sold by the online merchant. To this end, a "network presence" may be viewed as a network portal or structure through which an online merchant can sell products. Such a portal may comprise, for example, a network site 123 such as a website or other type of network site 123. Alternatively, a "network presence" may comprise a so called "store" that is facilitated by a central entity such as EBAY™, GOOGLE™, YAHOO®, or other provider. Such a store may be called, for example, an "eBay Store," etc. Such stores may facilitate the listing of products for sale by online merchants, where the central entity typically facilitates payment and the infrastructure that operates the stores. In such case, such stores may not comprise a separate network site, but may be presented as part of a network site associated with the central entity as can be appreciated. In addition, the products sold through the network presence of online merchants may comprise goods and/or services.

With the foregoing in mind, in the following discussion, first the structural makeup of the various components of the data communications network 100 is described, followed by a description of the operation of the same.

Each of the servers 103 and/or 109 may comprise, for example, a server computer or like system. The servers 103 and/or 109 may represent multiple servers arranged, for example, in one or more server banks or other arrangements. Such servers may be located in a single installation or may be dispersed among many different geographical locations. To this end, a server 103 and/or 109 may be viewed as a server "cloud" that represents the computing capacity of multiple servers, etc.

Various applications and data are stored or executed in the server 103 according to various embodiments. The data associated with the operation of the various engines and applications described below may be stored in one or more data stores 126 as can be appreciated. The applications executed on the server 103 include various network server applications 129 and ecommerce applications 133. The term "ecommerce" stands for "electronic commerce" as can be appreciated. The network server applications 129 may comprise, for example, web servers or other types of network server applications 129 that provide browser access or other appropriate types of access to clients 106 and the like using various protocols such as the transmission control protocol/Internet Protocol (TCP/IP). The ecommerce applications 133 facilitate the network presence of a plurality of online merchants. According to one embodiment, the ecommerce applications 133 also serve up network pages such as web pages and the like that facilitate access to the online merchants to their network site 123 or other network presence so that they may add and delete products, enter pricing, perform maintenance, and perform other functions as necessary.

As will be described herein, the fact that the network presences of a plurality of online merchants are hosted by the server 103 allows commercial intelligence to be obtained from the aggregate sales transaction data 153 of all the online merchants. Such commercial intelligence can be used to generate recommendations to improve the performance of individual online merchants. To this end, although the online merchants may sell a smaller volume of product over time, they can have the benefit of commercial intelligence based on the aggregate volume of all of the merchants. To this end, the commercial intelligence available to very large scale retailers who move very large volumes of products and the like is advantageously made available to the smaller merchant to help them to compete in the online marketplace.

Stored within the data store 126 is seller network presence data 143 that includes all data needed by the ecommerce applications 133 to provide for the network presence of one or more online merchants. To this end, the seller network presence data 143 includes product catalogs 146, sales transaction data 149, client site interaction data 153, network site feedback data 156, and other data. The product catalog 146 includes, for example, a listing of all products sold by a respective online merchant. The sales transaction data 149 comprises the records of all sales transactions conducted in selling products by an online merchant. The client site interaction data 153 includes data related to the interaction with the network presence of an online merchant on the part of customers. For example, such client site interaction data 153 may include data indicating network pages viewed, products viewed, and other actions taken. The network site feedback data 156 includes information generated from customer surveys and other sources that provide feedback as to the operation of the network presence of an online merchant.

Also stored in the data store 126 is improvement tracking data 159 that includes statistics relating to how the effectiveness of the network presence of various online merchants may have been improved or changed due to the implementation of recommendations provided to an online merchant hosted on the server 103 by a central entity. The statistics may relate to multiple online merchants (i.e. averaged, etc.) or to single merchants. In addition, stored in the data store 126 are several recommendations 163. The recommendations 163 are created and added to the data store 126 over time.

Each recommendation 163 includes criteria 166. A given recommendation 163 may be forwarded to an online merchant to provide guidance as to how the online merchant can improve the effectiveness of their network presence in selling products and performing other tasks as can be appreciated.

The criteria 166 are employed to determine whether a given recommendation 163 is applicable to the network presence of a respective online merchant.

Also executed on the server 103 are a seller improvement engine 136 and a recommendation learning engine 139. The seller improvement engine 136 is executed in the server 103 in order to present recommendations 163 to online merchants to help such online merchants improve the effectiveness of the network presence of an online merchant in selling products as can be appreciated.

In addition, the seller improvement engine 136 may provide other information to online merchants as will be described. The recommendation learning engine 139 operates on the seller network presence data 143 stored in the data store 126 for all online merchants in order to identify new recommendations 163 that may be used to improve the commercial tactics of online merchants and to perform other functions as will be described.

The client 106 is representative of a plurality of client devices coupled to the network 113. The client 106 may comprise, for example, a processor-based system such as computer system. Such a computer system may be embodied in the form of a desktop computer, a laptop computer, a personal digital assistant, a cellular telephone, set-top box, music players, web pads, tablet computer systems, or other devices with like capability. The client 106 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 173, indicator lights, speakers, etc. The display device 173 may comprise, for example, cathode ray tubes (CRTs), liquid crystal display (LCD) screens, gas plasma-based flat panel displays, LCD projectors, or other types of display devices, etc.

Executed within the client 106 are various applications including a browser application 176. The client browser application 176 is configured to interact with the ecommerce applications 133 and other applications on the server 103 through the network server applications 129 according to an appropriate protocol such as the Internet Protocol Suite comprising Transmission Control Protocol/Internet Protocol (TCP/IP) or other protocols. To this end, the browser application 176 may comprise, for example, a commercially available browser such as INTERNET EXPLORER® sold by Microsoft Corporation of Redmond, Wash., or MOZILLA® FIREFOX® which is promulgated by Mozilla Corporation of Mountain View, Calif., or other type of browser. Alternatively, the browser application 176 may comprise some other application with like capability. When executed in the client 106, the browser application 176 renders network pages that include various user interfaces 179 for display.

The third party server 109 includes various server applications that implement a merchant network site 183. The merchant network site 183 may represent the network presence of an online merchant that is facilitated on the server 109. To this end, various data may be stored in the server 109 such as a merchant product catalog 186 and sales transaction data 189 that is accessed and/or generated during the ordinary course of business by the merchant network site 183. The data associated with the merchant product catalog 186 and the sales transaction data 189 may be sent to the server 103 in order to generate recommendations for how the network presence represented by the merchant network site 183 may be improved as will be described.

Next, a general discussion of the operation of the various components of the data communication network 100 is provided. To begin, it is assumed that the ecommerce applications 133 present various network pages associated with one or more network sites 123 that provide for the network presence of online merchants as described above. According to one embodiment, the ecommerce applications 133 are configured to serve up various network pages to online merchants to facilitate the listing of products, the specification of pricing, the specification of available inventory, and for other purposes as can be appreciated. Such network pages may include, for example, a link or other component through which a given online merchant can navigate to or otherwise access merchant improvement content served up by the ecommerce applications 133.

According to one embodiment, such merchant improvement content includes recommendations 163 as to how such online merchants can improve the operation of their network presence so as to be able to presumably sell more products resulting in greater profit. The recommendations 163 stored within the data store 126 are accessed and applied to specific online merchants when appropriate. Some recommendations 163 may not apply to all online merchants whose network presence is hosted by the server 103. According to one embodiment, the criteria 166 associated with each of the recommendations 163 is examined to determine whether a given recommendation 163 applies to the network presence of a given online merchant.

The seller improvement engine 136 is implemented in the server 103 in order to identify at least a subset of the recommendations 163 that are applicable to the network presence of a given one of the online merchants. At any given time, each recommendation 163 may or may not have already been implemented at some point in the past with respect to the network presence of a given online merchant. The subset of recommendations 163 is then presented to the online merchant in an appropriate manner. Associated with each recommendation 163 presented is an implementation status. To this end, the seller improvement engine 136 determines the implementation status for each of the recommendations 163 identified in the subset that are applicable to the network presence of the respective online merchant before the recommendations 163 are presented. Upon viewing the recommendations 163, an agent of the online merchant can proceed to implement such recommendations 163 to improve the operation of the network presence of the online merchant.

In one embodiment, a central entity operates the server 103 and facilitates the network presence of the respective online merchants. The central entity has access to the sales transaction data 149 from which the central entity can determine how much improvement an online merchant may expect to achieve in the sales of their products if they implement the various recommendations 163 presented. To this end, the sales transaction data 149 may provide an indication as to what degree performance may improve based upon the implementation of a recommendation 163 based on past experience. In addition, with respect to each recommendation 163, the central entity may further be configured to facilitate an implementation of the recommendations 163 with respect to the network presence of one of the online merchants by implementing a wizard or other type of guide to walk the online merchant through the implementation of a given recommendation 163 with respect to their network presence.

Further, when a given recommendation 163 is implemented for the network presence of an online merchant, the sales of one or more products through such network presence relative to the time in which the recommendation 163 was implemented are stored in the sales transaction data 149. This data may be viewed to determine an impact upon the sales or other aspect of the operation of the network presence due to the implementation of the recommendation 163. To this end, the sales occurring within a window of time before and after the time in which the recommendation 163 was implemented may be tracked so that an impact of the implementation of a recommendation 163 may be quantified. For example, such an impact may be specified as a percent increase or decrease in predefined activity with respect to an online merchant.

Such activity may comprise, for example, sales transactions, conversion rates, click-throughs, product views, or other activity that occurs within the time before and after the recommendation 163 is implemented. To this end, the sales may be tracked by examining the sales transaction data 149, the client site interaction data 153, or other data stored in the data store 126. According to another embodiment, the seller improvement engine 136 may encode for display the sales or other factors associated with the operation of the network presence of the online merchant relative to the time in which the recommendation 163 was implemented as will be described.

The recommendation learning engine 139 is configured to identify improvements in the product offerings of the network presence of various online merchants. Accordingly, various recommendations 163 may be generated and presented to online merchants to recommend improvement of the selection of products offered by the online merchants. In particular, the recommendation learning engine 139 may apply commercial intelligence obtained from the aggregation of sales transaction data 149 from the network presence of multiple ones of the online merchants to the product offering of individual online merchants to determine where they can improve their product selection.

For example, various affinities between products may be identified in the overall aggregated sales transaction data 149 associated with all online merchants. Such affinities may then be applied to the product selection of a given online merchant to produce appropriate recommendations 163. Such affinities are associations between products identified by the fact that many customers typically purchase such products together, or identified by other types of associations.

Further, products that should be deleted from the selection offered by an online merchant may be identified. Such may be products that see little sales movement. Once additions or deletions to a selection of products offered by an online merchant are identified, they may be presented to the online merchant in the form of a recommendation 163 as will be described. In addition, the seller improvement engine 136 may be configured to quantify the performance of a component of the operation of the given network presence of an online merchant relative to the network presence of a plurality of other ones of the online merchants. To this end, the seller improvement engine 136 can identify, for example, the quantity of one or more items that were sold through the network presence of the online merchant relative to the average number of such items that were sold in the same time period by all of the other online merchants for which a network presence is maintained in the server 103. In addition, recommendations 163 may also be presented that are directed to an improvement of the performance of the component of the operation of the network presence to address any underperformance noted. In addition, the seller improvement engine 136 and the recommendation learning engine 139 include other functions as will be described.

The seller improvement engine 136 may further be configured to automatically implement recommendations 163 with respect to the network presence of an online merchant. To this end, the seller improvement engine 136 may be configured to obtain a pre-authorization from an online merchant to automatically implement various improvements in their network presence. Alternatively, automated improvements may be implemented for the network presence of an online merchant without pre-authorization. The types of improvements that may be automatically implemented include improvements that can be implemented without manual intervention. Such improvements may comprise, for example, the automatic generation of text or tags for products sold by the online merchant to aid search engines in finding such products. Also, associated products may be added to the product offering of the network presence of the online merchant to increase sales. In addition, there may be many other types of improvements that may be implemented automatically without manual intervention.

In addition, the merchant network site 183 hosted on the third party server 109 is configured to facilitate the network presence of an online merchant. To this end, the merchant network site 183 facilitates sales of products listed in the merchant product catalog 186. The sales transaction data 189 includes information about the sales of products made through the merchant network site 183. In one embodiment, the merchant network site 183 is configured to send data from the merchant product catalog 186 and the sales transaction data 189 to the server 103 to be analyzed by the seller improvement engine 136. To this end, the seller improvement engine 136 may be configured to generate recommendations to improve the operation of the merchant network site 183 in much the same manner as is done with respect to online merchants whose network presence is hosted by the server 103 described above. Data sent from the third party server 109 to the server 103 may be formatted according to a predefined protocol. Also, the online merchant whose network presence is hosted by the third party server 109 may access the recommendations and other information as described herein that was generated based at least upon analysis of the merchant product catalog 186 and the sales transaction data 189 through a client 106 as described herein.

Next, a number of user interfaces 179 are described that are served up to the client 106 to facilitate the presentation of recommendations 163 and other information to online merchants as will be described. It is understood that such user interfaces 179 are presented merely as examples. Accordingly, other types of graphical components or views may be employed beyond those depicted in the following figures.

Figure 2:
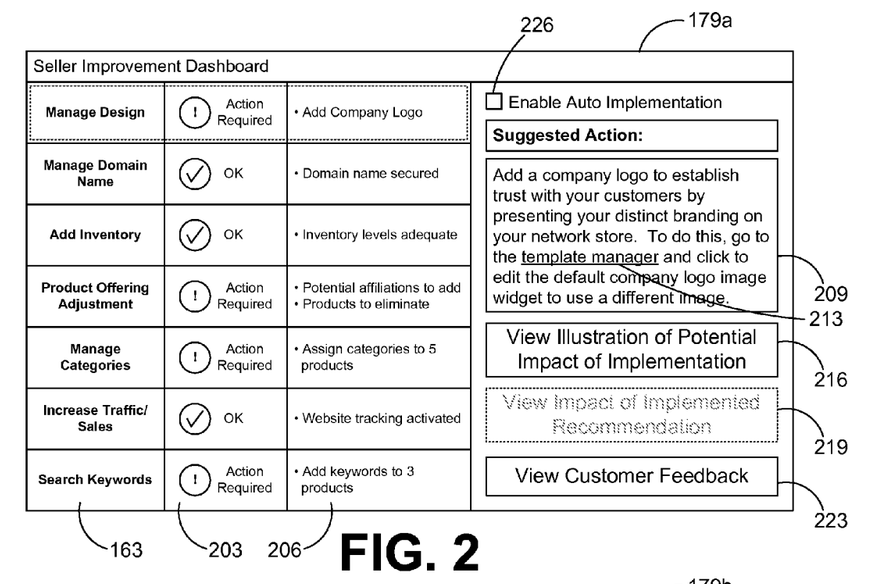
FIG. 2 is a drawing of one example of a user interface that is generated in a server and presented to a user on a client in the data communications network of FIG. 1 according to an embodiment of the present disclosure.

Referring next to FIG. 2, shown is one example of a user interface 179 (FIG. 1) denoted herein as user interface 179a, that facilitates communication of recommendations 163 to an online merchant hosted on the server 103 (FIG. 1), for example, by a central entity. To this end, the seller network presence data 143 (FIG. 1) associated with such online merchant is stored in the data store 126 (FIG. 1) and provides the central entity with information from which it is determined whether the online merchant is operating in an optimal manner to maximize sales. To this end, the seller improvement engine 136 (FIG. 1) may review the seller network presence data 143 of all merchants to identify recommendations 163 that can be sent to each of the online merchants as deemed appropriate.

The user interface 179a lists a number of recommendations 163 such as managing the design of a network presence, managing a domain name associated with the network presence, adding or changing inventory sold through the network presence, and adjusting a product offering of the network presence. The recommendations 163 listed further relate to managing categories assigned to products in association with the network presence, increasing traffic and sales, managing search keywords associated with various products, and other recommendations 163.

The "manage design" recommendation 163 provides suggestions to improve the look and feel of a network presence such as a network site 123 or other type of presence of an online merchant such that users may be more inclined to purchase products from the online merchant. Such action may involve, for example, adding a company logo, changing colors of the presence, or other types of action. The "manage design" recommendation 163 is highlighted as being selected by a user. To this end, such recommendations 163 may be selected by positioning a cursor on a recommendation 163 and clicking thereon or by performing some other action as can be appreciated.

Associated with each of the recommendations 163 is an implementation status 203. The implementation status 203 indicates whether action has been taken to implement the recommendation 163. Also associated with each of the recommendations 163 is an explanation 206 that indicates the type of actions that may be taken with respect to a network presence of an online merchant to implement the recommendation 163. Alternatively, the explanation may indicate other information relating to the recommendation 163.

Further, for a highlighted one of the recommendations 163, specific details describing the recommendation may be displayed in a "suggested action" box 209. The suggested action box 209 may include a link 213 or other component that may send the user through a predefined process to implement the highlighted recommendation 163. Such a process may be presented, for example, in the form of a wizard or other presentation as can be appreciated.

The user interface 179a also includes various buttons, links, or other graphical components that may be manipulated to generate further views of information relative to the recommendations 163. For example, a "potential impact" button 216 may be manipulated to generate a graph or chart of data that shows the potential impact upon sales of an online merchant after the implementation of a highlighted one of the recommendations 163. Such a potential impact may be identified by averaging the appropriate sales transaction data 149 (FIG. 1) associated with the impact of the implementation of such a recommendation 163 by other online merchants whose network presence is facilitated by the server 103 as described above.

An "actual impact" button 219 is also provided that causes the generation of subsequent user interfaces 179 to illustrate an actual impact of the implementation of a given recommendation 163 as will be described. Such illustration may present actual sales transaction data 149 of the online merchant before and after the implementation of the recommendation 163 to indicate a change therein. Note that the potential impact button 216 and actual impact button 219 may be active or inactive (i.e., grayed out) depending upon which of the recommendations 163 is highlighted. To this end, the potential impact button 216 may be active when the implementation status 203 of a highlighted recommendation 163 is "action required." Alternatively, when the implementation status 203 of a highlighted recommendation 163 is "OK," then the actual impact button 219 may be active.

The user interface 179a also includes a "view customer feedback" button 223 that allows online merchants to view customer feedback results based upon surveys or other information as will be described. In addition, the user interface 179a includes an "enable auto implementation" toggle 226 that allows an online merchant to pre-authorize the automated implementation of recommendations that may be implemented without manual intervention as mentioned above.

Although the recommendations 163 depicted in the user interface 179*a* are delivered to a user by way of a browser application 176 (FIG. 1) in the form of a dashboard generated by the seller improvement engine 136 (FIG. 1), it is possible that the same information may be presented to an online merchant in some other manner. For example, such information may be included in electronic mail (email) messages that are sent to an online merchant, SMS messages, physical mail delivered to customers, or in other manners as can be appreciated.

The various types of recommendations 163 that may be depicted in the user interface 179*a* may be based upon experience with online sales or based on other marketing or business considerations. The actions to be taken in view of such recommendations 163 are generally known to result in improved performance of the network presence of an online merchant. For example, the "manage design" recommendation 163 is presented so as to prompt an online merchant to add appropriate company logos or other design aspects to their network presence. The "manage domain name" recommendation 163 recommends creating a domain name for the online merchant and reflects the fact that customers may be more likely to purchase products from an online merchant that maintains their own domain name on the network. The "add inventory" recommendation 163 prompts a given online merchant to maintain adequate levels of inventory to service their customers. This prevents online merchants from running out of product, thereby diminishing sales and the effectiveness of their network presence.

The "product offering adjustment" recommendation 163 informs the online merchant of potential changes that they might want to make to their product line for more effective conversion resulting in greater profits. Such recommendations 163 may be to add certain items to their product line for various reasons. Alternatively, such a recommendation 163 may suggest the elimination of products that are poor performers for any one of a number of reasons. In addition, other types of adjustments to a product line of an online merchant may be recommended.

The "manage categories" recommendation 163 involves associating products with various categories such that the ecommerce applications 133 can better present such products to customers. For example, various categories may exist such as clothing, electronics, books, and other categories that facilitate customer searches for products from among the full inventory available through the ecommerce applications 133 as can be appreciated. In some situations, if appropriate categories are not assigned to products in a product catalog 146 of a respective online merchant, then such products might not actually show up in response to a customer specification of items viewed based on a given taxonomy that employs such categories, etc.

The "increase traffic/sales" recommendation 163 may involve the implementation of various tracking capabilities of the ecommerce applications 133 or may be implemented by the recommendation learning engine 139 to further determine how the network presence of the online merchant can be improved and traffic and sales through such network presence increased.

The "search keywords" recommendation 163 prompts an online merchant to associate keywords with products in the product catalog 146 for such online merchant. To this end, the keywords may be employed as indices to identify products in response to customer word searches as can be appreciated.

Other types of recommendations 163 may include those that inform an online merchant of trends in sales that may cause an online merchant to make adjustments to their network presence or to the products offered. Such trends may be noticed by viewing all of the commercial activity by all online merchants whose network presence is hosted on the server 103. Such trends may comprise, for example, types of products that are experiencing heightened sales in the marketplace, types of colors of items that are currently "hot" or preferred by customers, or other types of trends.

Also, a recommendation 163 may inform an online merchant of cyclical trends in business such as the approach of holiday sale seasons or other types of cyclical concerns. To this end, such recommendations 163 might prompt online merchants to alter the design of their network presence to suit the cyclical trends such as, for example, including holiday declarations in the design, etc.

Also, a recommendation 163 may specifically inform an online merchant that a given item is out of stock, or that items related to the product offering of an online merchant that are sold by other online merchants are out of stock. In such case, a recommendation 163 may inform an online merchant that it might be advisable to obtain such products for sale through their network presence. In addition, the recommendations 163 may prompt many other types of actions that cause improvement in the operation of the network presence of an online merchant. In one embodiment, new recommendations 163 may be generated based upon a review of the sales transaction data 149, client site interaction data 153, or other data associated with some or all of the online merchants whose network presence is hosted on the server 103.

Figure 3:
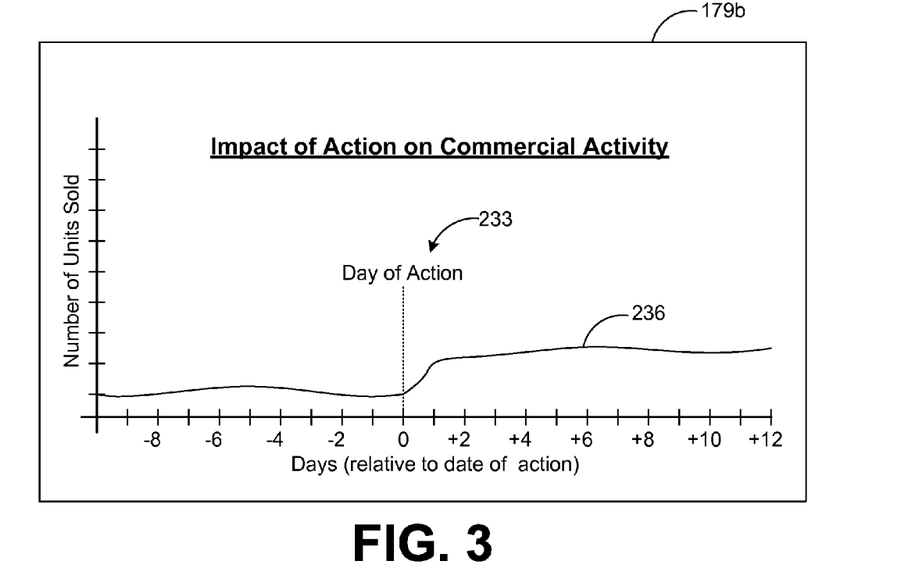
FIG. 3 is a drawing of another example of a user interface that is generated in a server and presented to a user on a client in the data communications network of FIG. 1 according to an embodiment of the present disclosure.

With reference then to FIG. 3, shown is an additional user interface 179*b* that depicts the actual impact of the implementation of a recommendation 163 (FIG. 2) according to various embodiments. In one embodiment, the user interface 179*b* is generated based upon a manipulation of the actual impact button 219 (FIG. 2) as described above.

The user interface 179*b* depicts the sales, for example, of at least one product relative to a time in which a given recommendation 163 was implemented. The time of implementation 233 is indicated in a chart that shows sales 236 relative to a number of days before and after the time of implementation 233. In this manner, an online merchant is informed of how their sales may have improved based upon the implementation of a given recommendation 163. In some cases, the improvement may involve the implementation of several recommendations 163. Given that the user interface 179*b* may illustrate the improvement of the network presence of the online merchant in a graphical depiction, the online merchant is thus provided with incentive to further implement the various recommendations 163 for which the implementation status 203 remains "action required." In this manner, each of the online merchants that have a network presence hosted through the server 103 may be more effective in selling products and may achieve greater profitability.

Note that in situations where a user has not yet implemented a recommendation 163, then the user interface 179*b* may depict averaged data compiled from the implementation of the same recommendation 163 for multiple other online merchants. To this end, the sales 236 depicted may comprise an average of sales of items by other online merchants tracked before and after an implementation of the respective recommendation 163 as can be appreciated. To this end, specific suggestions may be made and, over time, the specific percentage of sales improvement that can be expected from the implementation of respective recommendations 163 based on historical data from multiple online merchants may become known.

Figure 4:
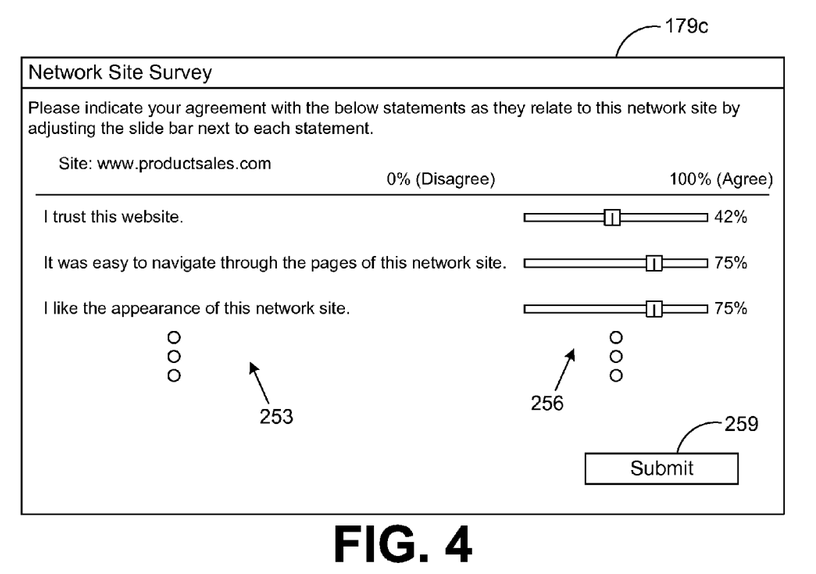
FIG. 4 is a drawing of still another example of a user interface that is generated in a server and presented to a user on a client in the data communications network of FIG. 1 according to an embodiment of the present disclosure.

With reference to FIG. 4, shown is a user interface 179*c* that is generated by the ecommerce applications 133 (FIG. 1) to survey customers who frequent the network presences of various online merchants or to survey other individuals who have knowledge of the network presences or may research the same. To this end, the network presence of a given online merchant may include a link, button, or other component that may be manipulated by a customer or other individual in order to facilitate the download of a user interface 179*c* or other interface that facilitates taking a survey about the network presence of the online merchant. To this end, the user interface 179*c* includes questions/statements 253 to which users may indicate answers 256. Answers may be indicated using slide bars, toggle components, input fields, or other components. According to one embodiment, a slide bar is employed so that a specific value between 0 and 100, for example, may be specified by a user to indicate their agreement or disagreement with a given statement.

The user interface 179*c* also includes a "submit" button 259 that may be clicked on by users to submit the results of the survey taken when completed. The results of the surveys are stored in the data store 126 (FIG. 1) as the network site feedback data 156 (FIG. 1) as mentioned above. To this end, the seller improvement engine 136 can solicit customer feedback with respect to the effectiveness of the network presence of online merchants hosted by the server 103 in order to further identify areas in which online merchants may improve their network presence for increased sales and other activity.

Figure 5:
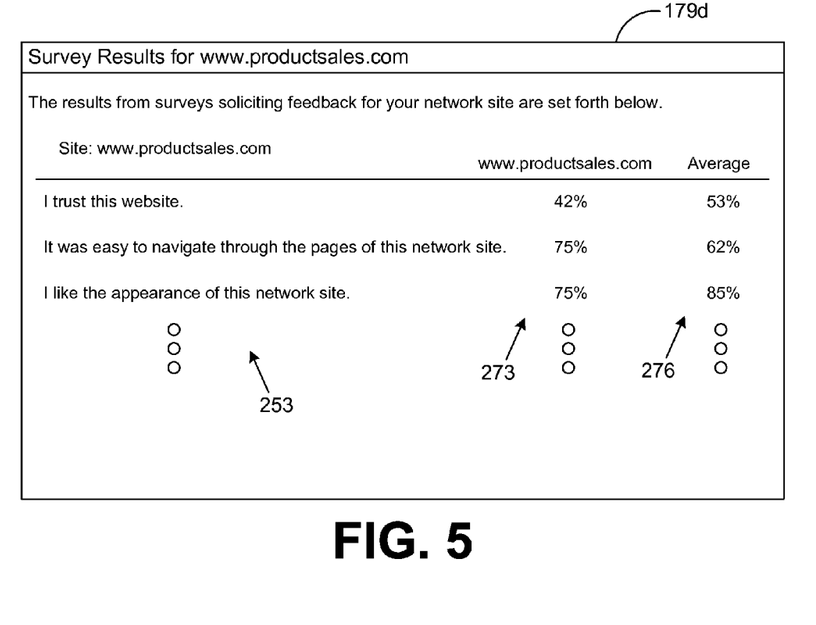
FIG. 5 is a drawing of yet another example of a user interface that is generated in a server and presented to a user on a client in the data communications network of FIG. 1 according to an embodiment of the present disclosure.

With reference next to FIG. 5, shown is a user interface 179*d* generated by the ecommerce applications 133 when requested by an online merchant to present the results of surveys taken by their customers. To this end, the user interface 179*d* may be generated by manipulating the "view customer feedback" button 223 (FIG. 2) described above, or such results may be presented upon an occurrence of other actions as can be appreciated. The user interface 179*d* includes the questions/statements 253 along with individual results 273 associated with the network presence of a respective online merchant and average results 276 associated with the averaging of survey results of some or all of the online merchants hosted by the server 103. To this end, a given online merchant can compare a measure of their performance to the averages generated based on data from other online merchants to determine where one may be deficient relative to others in an attempt to prompt further improvement. In addition, rather than showing survey results, the user interface 179*d* may depict the number of sales of specific items relative to the averaged sales of such items by other online merchants as can be appreciated.

Figure 6:
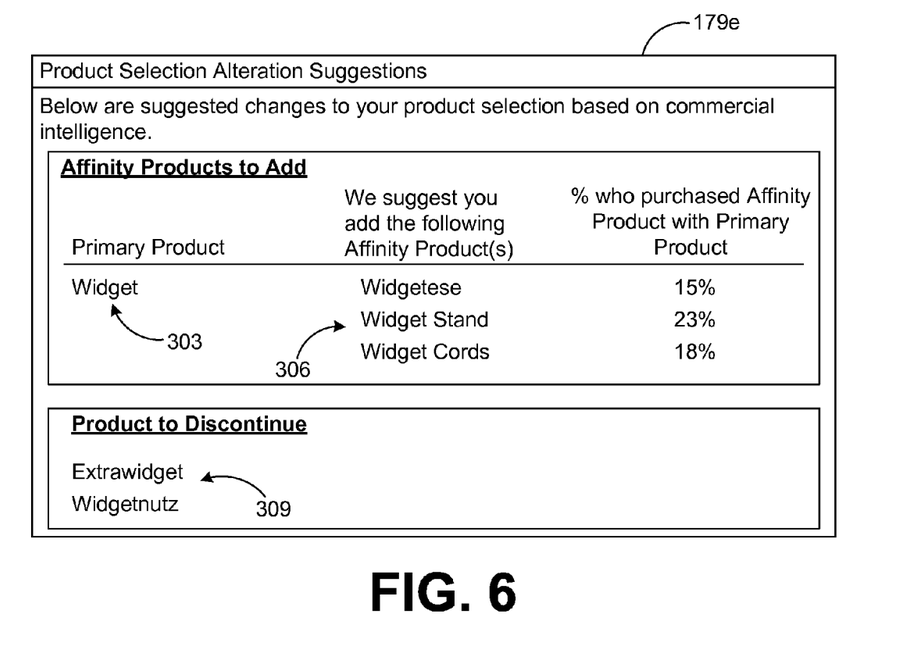
FIG. 6 is a drawing of still another example of a user interface that is generated in a server and presented to a user on a client in the data communications network of FIG. 1 according to an embodiment of the present disclosure.

With reference to FIG. 6, shown is an example of a user interface 179*e* that is generated as part of a process of informing an online merchant of the types of adjustments that may be made to the line of products offered by such online merchants through their network presence. Specifically, the user interface 179*e* depicts recommended products to add to a product line offered by a given online merchant as well as products to discontinue. The section that lists products to add may identify primary products 303 currently included in the selection of an online merchant for which it is determined there is a relationship with affinity products 306.

In particular, commercial intelligence obtained from the sales of products by the online merchants as reflected in the sales transaction data 149 (FIG. 1) may indicate various affinities between sets of products that are often purchased together at the same time by customers. For example, it may be determined by viewing the various sales transaction data 149 that a predefined percentage of customers that purchase a first product may also purchase a second product. Such trends may be employed to improve the product offerings of various online merchants as presented in the user interface 179*e*. In particular, each product currently offered by an online merchant may be presented as a primary product 303 in a user interface 179*e* with affinity products 306 displayed in association with the respective primary product 303, along with a percentage of times the affinity products 306 are purchased when the primary product 303 is purchased. To the extent that there are many primary products 303 to be depicted, a window may be provided that allows a user to scroll down through the various primary products 303 to identify all of the affinity products 306 to be offered.

In addition, the user interface 179*e* may identify poorly performing products 309 currently existing within the product offering of an online merchant. To this end, the user interface 179*e* may indicate those products that the online merchant should discontinue based upon commercial intelligence gained from the sales transaction data 149 of all of the online merchants hosted by the server 103 (FIG. 1). To this end, such commercial intelligence may indicate that certain products will sell poorly when offered relative to other products in a given product line. Further, it may be determined that some products just sell poorly all by themselves.

Next, with respect to the several of the following figures, various flowcharts that depict functionality of various components implemented in the server 103 are described. It is understood that each flowchart described herein may be viewed as a component of a system implemented in the server 103. Alternatively, such flowcharts may be viewed as steps implemented in the server 103.

Figure 7:
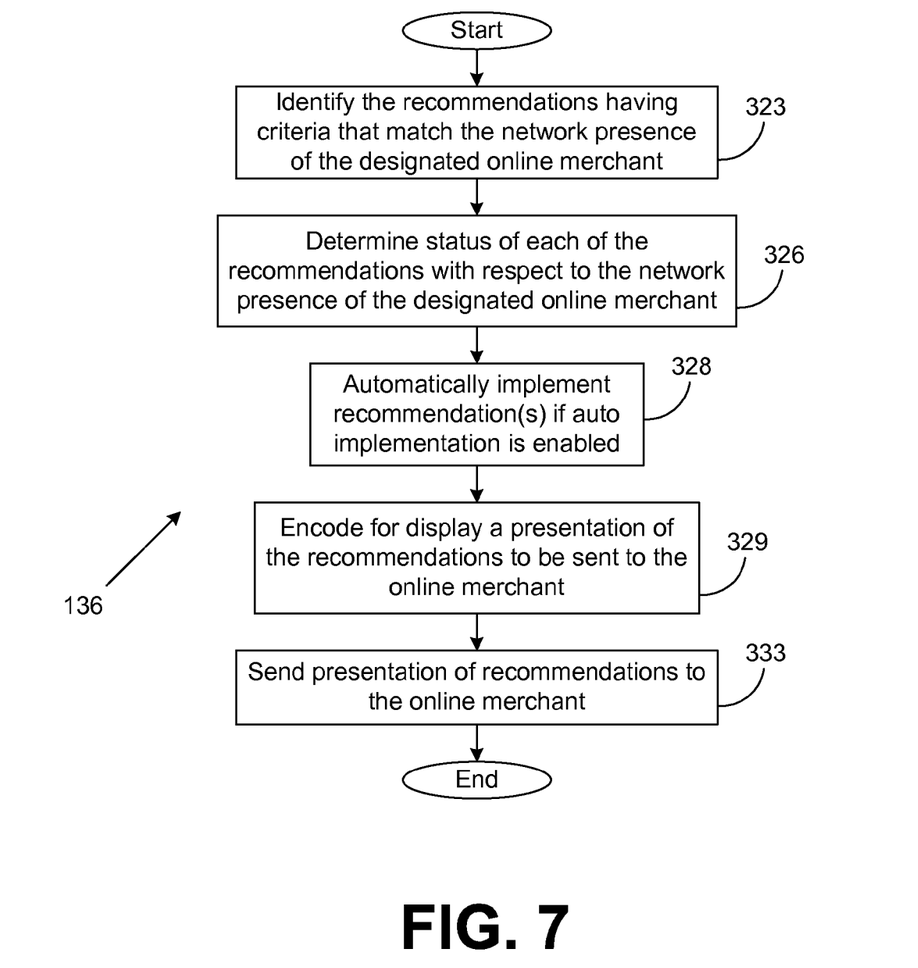
FIG. 7 is a flowchart that provides one example of functionality of a seller improvement engine executed on a server in the data communications network of FIG. 1 according to an embodiment of the present disclosure.

To begin, with reference to FIG. 7, shown is a flowchart that depicts one example of the functionality of the seller improvement engine 136 in compiling the recommendations 163 (FIG. 2) that apply to the specific network presence of a given online merchant. The functionality of the flowchart of FIG. 7 may be implemented when a user clicks on a button, link, or other component causing the generation of a plurality of recommendations 163 as described above.

To begin, in box 323, the seller improvement engine 136 identifies recommendations 163 that have criteria that match or are otherwise applicable to the network presence of a designated online merchant. Thereafter, in box 326, a status of each of the identified recommendations 163 is determined with respect to the network presence of the designated online merchant. Then, in box 328, the seller improvement engine 136 automatically implements any of the identified recommendations 163 that can be implemented without manual intervention if automatic implementation of recommendations 163 is enabled. Alternatively, the automatic implementation of recommendations 163 may be executed without pre-authorization by an online merchant.

Next, in box 329, the seller improvement engine 136 encodes for display a presentation of the recommendations 163 to be sent to the online merchant. To this end, the display may comprise a user interface such as the user interface 179*a* (FIG. 2) or other appropriate display as can be appreciated. Next, in box 333, the presentation of the recommendations 163 in the form of a user interface or other format is transmitted to the online merchant. To this end, such presentation may be transmitted in the form of an HTML document as a dashboard rendered using a browser application 176 (FIG. 1). The presentation may be sent by the seller improvement engine 136 directly or through the ecommerce applications 133 (FIG. 1). Such a presentation may also be sent as an email, SMS message, or via some other messaging format. Thereafter, this portion of the functionality of the seller improvement engine 136 ends as shown.

Figure 8:
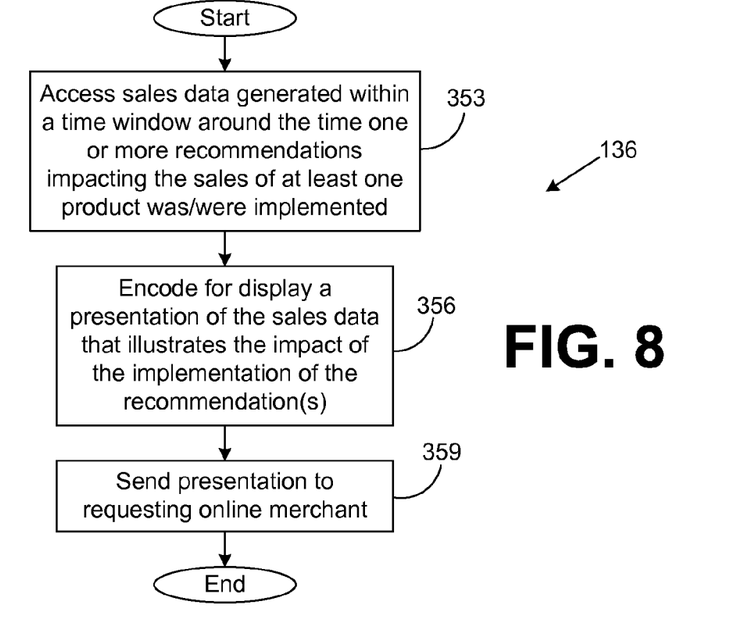
FIG. 8 is a flowchart that provides another example of functionality of a seller improvement engine executed on a server in the data communications network of FIG. 1 according to an embodiment of the present disclosure.

With reference to FIG. 8, shown is a flowchart that provides one example of further functionality of the seller improvement engine 136 in generating a presentation of data that indicates an actual impact of the implementation of one or more recommendations 163 (FIG. 2). To begin, in box 353, sales transaction data 149 (FIG. 1) that was generated within a time window around the actual time of implementation 233 (FIG. 3) of a recommendation 163 that impacted the sales of at least one product is accessed. Alternatively, the data may comprise an average of the sales transaction data 149 of some or all of the online merchants, etc., generated within a time window around the actual time of implementation 233 (FIG. 3) for each online merchant. Such averaged data may be pre-calculated, for example, by the recommendation learning engine 139 (FIG. 1). Thereafter, in box 356, a display of the presentation of the sales data is encoded that illustrates the impact of the implementation of the one or more recommendations 163 as described above, for example, with respect to the user interface 179b (FIG. 3). Thereafter, in box 359, the presentation of the sales data generated in box 356 is transmitted to a requesting online merchant. To this end, the presentation may be transmitted in the form of a user interface 179b that is served up to a client 106 (FIG. 1) in response to browser requests, or the information may be transmitted to an online merchant in some other manner as described above. Thereafter, this portion of the functionality of the seller improvement engine 136 (FIG. 1) ends as shown.

Figure 9:
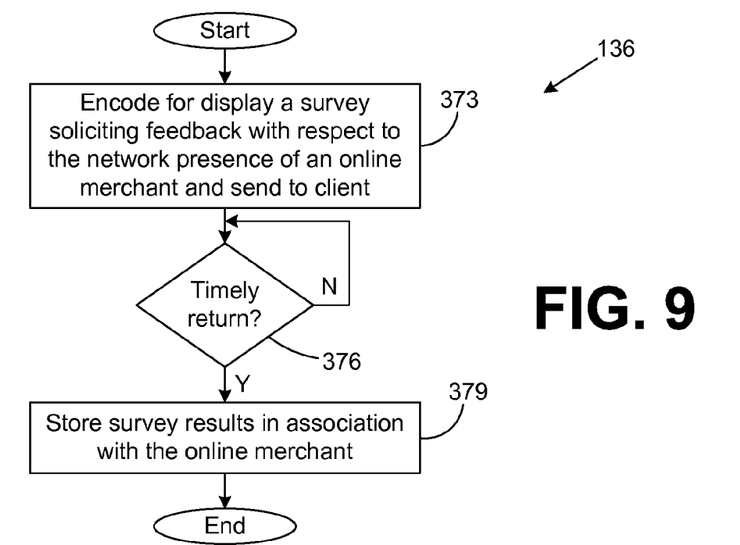
FIG. 9 is a flowchart that provides still another example of functionality of a seller improvement engine executed on a server in the data communications network of FIG. 1 according to an embodiment of the present disclosure.

With respect to FIG. 9, shown is a flowchart that depicts a portion of the functionality of the seller improvement engine 136 according to various embodiments. The functionality depicted in FIG. 9 is implemented in the seller improvement engine 136 in order to obtain a survey from customers about the network presence of various online merchants. The functionality may be executed in response to a customer manipulation of a link, button, or other component associated with the network presence of a given online merchant as mentioned above.

To begin, in box 373, the seller improvement engine 136 encodes for display a survey soliciting feedback with respect to the network presence of an online merchant and sends the same to a client 106 (FIG. 1) in response to a browser request or other request as can be appreciated. Thereafter, in box 376, the seller improvement engine 136 waits to receive a timely reply. Note that where a reply is not received such as, for example, when a customer decides not to complete the survey, then this portion of the seller improvement engine 136 may timeout and end accordingly.

In box 379, any survey results received from a client 106 from a survey completed by a customer are stored in the network site feedback 156 (FIG. 1) and associated with the respective online merchant for which the survey was generated. To this end, the survey that is encoded for display may be similar to the survey represented in the user interface 179c (FIG. 4) or may be presented in some other format as can be appreciated. Once the survey results are stored in the data store 126 (FIG. 1), this portion of the seller improvement engine 136 ends.

Figures 10, 11:
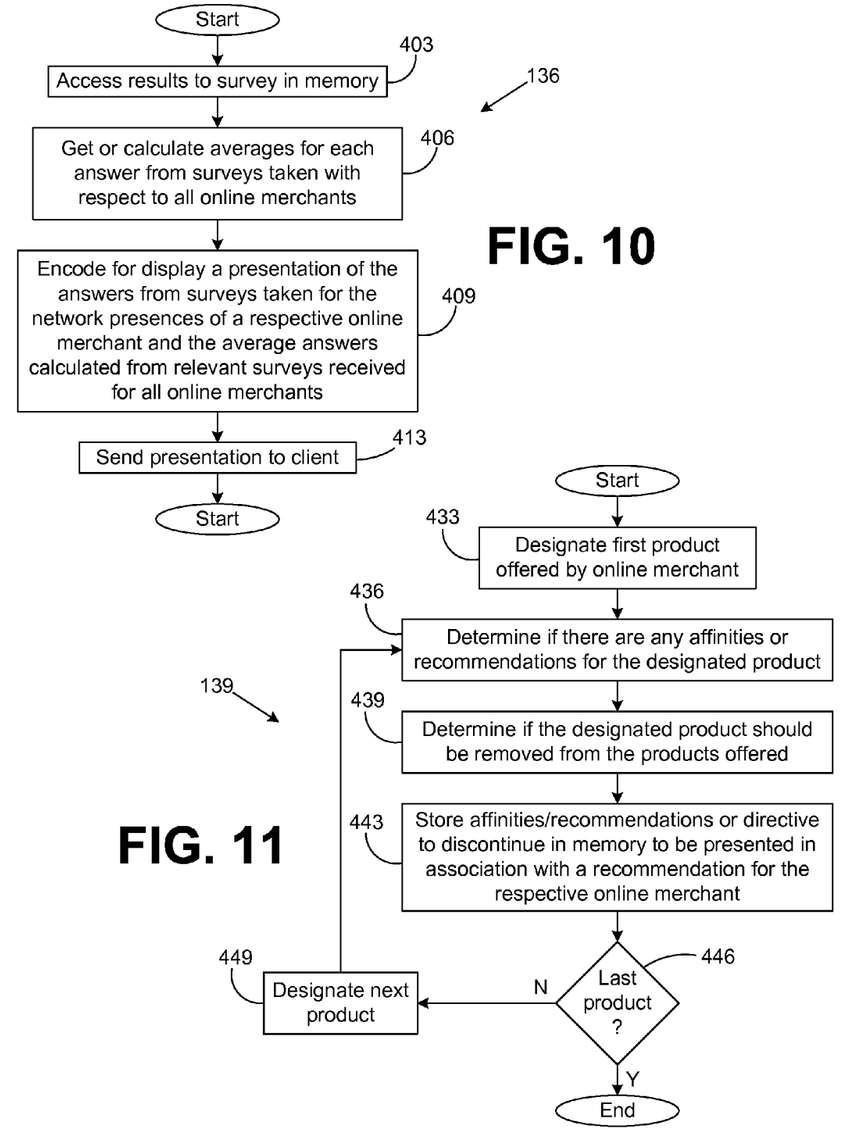
FIG. 10 is a flowchart that provides yet another example of functionality of a seller improvement engine executed on a server in the data communications network of FIG. 1 according to an embodiment of the present disclosure.
FIG. 11 is a flowchart that provides an example of functionality of a recommendation learning engine executed on a server in the data communications network of FIG. 1 according to an embodiment of the present disclosure.

Referring next to FIG. 10, shown is a flowchart that provides a further example of functionality implemented by the seller improvement engine 136 according to various embodiments. As described, the flowchart of FIG. 10 depicts the functionality of accessing survey data and presenting the results to a respective online merchant so that they may take steps to improve the operation of their network presence.

Beginning with box 403, the seller improvement engine 136 accesses results to one or more surveys stored as the network site feedback 156 (FIG. 1) for some or all of the online merchants in the data store 126 (FIG. 1) associated with the server 103 (FIG. 1). Thereafter, in box 406, the seller improvement engine 136 gets or calculates averages for each answer from the surveys taken with respect to all of the merchant network sites. To this end, averages may be continually calculated and stored as the improvement tracking data 159 (FIG. 1) for all of the online merchants. To this end, the calculation may be performed in real time or the calculation may be performed by the recommendation learning engine 139 (FIG. 1) at a prior time and stored as the improvement tracking data 159 as described above.

Thereafter, in box 409, the seller improvement engine 136 encodes for display a presentation of the answers from the surveys taken for the network presence of a respective online merchant. Also, the averaged answers calculated from the relevant surveys received from all online merchants are included. To this end, such a presentation may include the subject matter as was described above with respect to the user interface 179d (FIG. 5) or may embrace some other type of presentation. Thereafter, in box 413, the presentation is sent to an appropriate client 106 (FIG. 1) requesting such presentation. To this end, the presentation may be depicted as a user interface 179 generated by a browser application 176 (FIG. 1) as described above. Alternatively, such a presentation may be transmitted to the online merchants in some other manner as described above. Thereafter, this functionality of the seller improvement engine 136 ends as shown.

Referring next to FIG. 11, shown is a flowchart that provides one example of functionality of the recommendation learning engine 139 according to various embodiments. The functionality depicted in FIG. 11 is that which employs commercial intelligence to identify adjustments that may be made to a product selection of a given online merchant. In particular, products to be added such as affinity products 306 (FIG. 6) associated with respective primary products 303 (FIG. 6) may be identified. Also, poorly performing products 309 (FIG. 6) are identified that an online merchant may be recommended to discontinue.

Beginning with box 433, a first primary product 303 offered by a given online merchant is designated for scrutiny. Thereafter, in box 436, it is determined whether there are any affinities or recommendations that may be made with respect to the designated primary product 303. For example, such affinities or recommendations may stem from commercial intelligence gained from the sales transaction data 149 of all of the merchants indicating that customers who purchase X product also purchase Y product or that a given product complements another, etc. Then, in box 439, it is determined based upon commercial intelligence whether the designated product 303 should be removed from the products offered by the online merchant. Such removal may be determined based upon a lack of sales for the product relative to other products in the product offering of the online merchant or based upon other commercial intelligence. Such removal may also be determined based upon the fact that a lot of other merchants are selling a given product and that the pricing for the product for the respective online merchant is not very competitive. Further, it may be desirable to discontinue offering a product for purchase if it is determined that a newer product is displacing demand for such a product, or that a given product is not within the target demographic of the network presence of the online merchant.

Thereafter, in box 443, all affinities, recommendations, or directives to discontinue sales of respective products are stored in the data store in association with a given merchant. Such data may be stored as part of the network site feedback 156 (FIG. 1), for example, associated with a given online merchant. Once stored, such data is thus available for the seller improvement engine 136 to generate an appropriate recommendation 163 with respect to the products offered by the online merchant. Then in box 446, the recommendation learning engine 139 determines whether the last product in the portfolio of products offered by a given online merchant has been examined. If not, then the recommendation learning engine 139 proceeds to box 449 to designate the next primary product 303 to be examined. Thereafter, the recommendation learning engine 139 reverts back to box 436. Otherwise, the recommendation learning engine 139 ends as shown.

Figure 12:
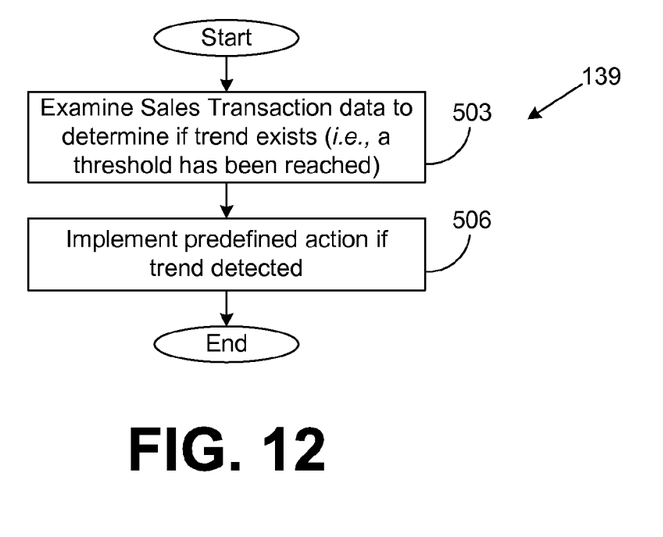
FIG. 12 is a flowchart that provides another example of functionality of a recommendation learning engine executed on a server in the data communications network of FIG. 1 according to an embodiment of the present disclosure.

With reference to FIG. 12, shown is a flowchart that shows example functionality of the recommendation learning engine 139 according to further embodiments of the present disclosure. The flowchart of FIG. 12 depicts functionality implemented as a portion of the recommendation learning engine 139 in order to spot trends within the activities of the various online merchants that may be used to improve the performance of all of the online merchants.

In particular, in box 473, the recommendation learning engine 139 examines sales transaction data 149 (FIG. 1) of all online merchants to identify if a trend exists. A trend may be specified based upon predefined criteria. For example, such criteria may employ thresholds that are applied to the sales activity over predefined time frames to identify products that are selling extraordinarily well or products that are selling poorly. Such trends may also comprise detecting either a positive or negative change in the sales of products across all online merchants within a given time frame. Ultimately, such identified trends may point to action that may be described in a recommendation to be presented to the online merchants to further enhance sales.

Some specific examples of trends may comprise detection of an overall drop in sales that correlates with a drop in inventory. As a consequence, a recommendation may be generated and presented to the respective online merchant that they should restock products, etc. Also, traffic increases through specific sales channels may be detected that result in a recommendation to increase advertisement expenditures for such sales channels. Further, another trend may involve a detectable drop in product sales due to a change made in the appearance or some other aspect of the network presence of a given online merchant. In such case, a recommendation may be generated advising such online merchant to roll back the changes made.

Still another detectable trend might comprise an increase in an average order value that correlates with the addition of new higher-priced items. Such a trend may result in a recommendation indicating that customers tend to exhibit trust in a merchant with expensive items and the merchant should consider stocking more of such items or expanding the selection of products with other comparable items. Also, a detectable trend may comprise the fact that sales of one or more products remain steady when such sales should be increasing, for example, due to the onset of a holiday sales season or other reason. In such case, a recommendation may be generated advising a merchant to launch a holiday promotion or other action to address the situation.

In box 476, a predefined action is implemented if a given trend is identified. An action may comprise, for example, generating an output that alerts operators of the server 103 (FIG. 1) as to the existence of the trend or flagging data for further scrutiny. Further, actions may comprise automated generation of recommendations 163 (FIG. 1) stored in the data store 126 (FIG. 1) to employ by the seller improvement engine 136. For example, in situations where trends are automatically detected, a lookup table or other data structure may be employed to correlate one or more recommendations to the detected trend that may be presented to an online merchant. In addition, recommendations may be selected to present to online merchants automatically based upon a predetermined probability that such online merchants will implement the recommendations. Thus, more frequently implemented recommendations may be presented before less frequently implemented recommendations given that a recommendation is most useful if or when implemented. In addition, other actions may be taken. Thereafter, this portion of the recommendation learning engine 139 ends as shown.

Figure 13:
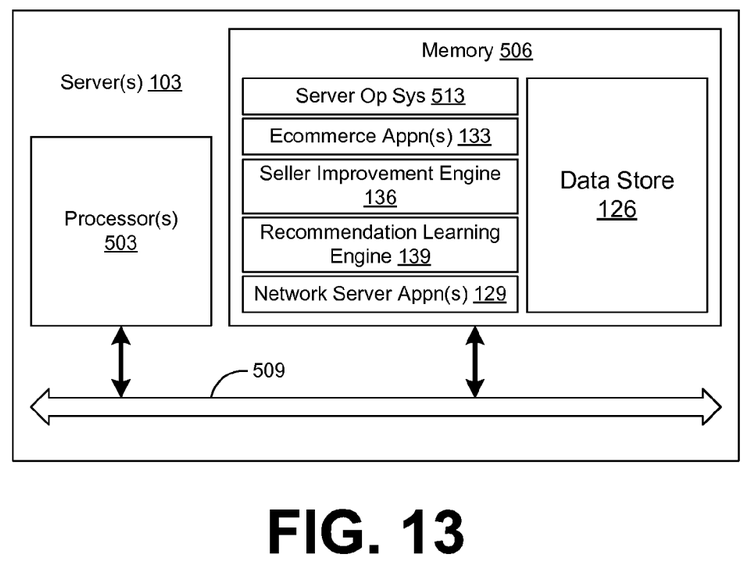
FIG. 13 is a schematic block diagram that illustrates one example of a server in the data communications network of FIG. 1 according to an embodiment of the present disclosure.

Referring next to FIG. 13, shown is a schematic block diagram of one example of the server 103 according to an embodiment of the present disclosure. The server 103 includes at least one processor circuit, for example, having a processor 503 and a memory 506, both of which are coupled to a local interface 509. To this end, the server 103 may comprise, for example, a server computer or like device. The local interface 509 may comprise, for example, a data bus with an accompanying address/control bus or other bus structure as can be appreciated.

Stored in the memory 506 are both data and several components and/or applications that are executable by the processor 503. In particular, stored in the memory 506 and executable by the processor 503 are a server operating system 513, the ecommerce application(s) 133, the seller improvement engine 136, the recommendation learning engine 139, and the network server application(s) 129, and potentially other applications.

Also, stored in the memory 506 is the data store 126 in which is stored the various data items described above so as to be accessible to the processor 503. It is understood that there may be other applications that are stored in the memory 506 and are executable by the processor 503 as can be appreciated. Also, other data may be stored in the memory 506 and accessed by the processors 503 beyond the data items described above.

A number of software components are stored in the memory 506 and are executable or executed by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 503 may represent multiple processors and the memory 506 may represent multiple memories that operate in parallel. In such a case, the local interface 509 may be an appropriate network that facilitates communication between any two of the multiple processors, between any processor and any one of the memories, or between any two of the memories etc. The local interface 509 may comprise additional systems designed to coordinate this communication, including, for example, performing load balancing. The processor 503 may be of electrical or of some other available construction.

The various applications and engines described above may be implemented using any one or more of a number of programming languages such as, for example, C, C++, C#, Visual Basic, VBScript, Java, JavaScript, Perl, Ruby, Python, Flash, or other programming languages.

Although the various applications and engines described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The block diagrams and/or flowcharts of FIGS. 7-12 show the functionality and operation of an implementation of the various applications and engines described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 7-12 show a specific order of execution, it is understood that the order of execution may differ from that which is depicted. For example, the order of execution of two or more blocks may be scrambled relative to the order shown. Also, two or more blocks shown in succession in FIGS. 7-12 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications and engines described herein comprise software or code, each can be embodied in any computer-readable medium for use by or in connection with an instruction execution system such as, for example, a processor in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method, comprising the steps of:

storing a plurality of recommendations in a memory accessible by a server, the recommendations being applicable to improve an operation of a network presence of a plurality of online merchants, wherein a criteria is associated with each of the recommendations, each criteria determining whether a corresponding one of the recommendations applies to a network presence of one of the online merchants;

automatically determining, in the server, a subset of the recommendations applicable to the network presence of the one of the online merchants;

determining, in the server, an implementation status for each of the recommendations in the subset with respect to the network presence of the one of the online merchants;

encoding for display the subset of recommendations along with the implementation status of each of the recommendations to an agent of the network presence of the one of the online merchants;

facilitating, in the server, an implementation of at least one of the recommendations with respect to the network presence of the one of the online merchants;

tracking, in the server, sales of at least one product occurring through the network presence of the one of the online merchants relative to a time in which the one of the recommendations was implemented; and identifying, in the server, an additional product offering to incorporate into an existing product offering through the network presence of the one of the online merchants, wherein at least one of the recommendations encoded for display recommends the additional product offering.

2. The method of claim 1, further comprising the step of quantifying a performance of at least one component of an operation of the network presence of the one of the online merchants relative to the network presence of other ones of the online merchants, wherein the subset of recommendations includes a recommendation directed to an improvement of the performance of the at least one component of the operation of the network presence of the one of the online merchants.

3. The method of claim 2, further comprising the step of presenting a process to identify an improvement that may be applied to the network presence of the one of the online merchants to address the performance of the at least one component of the operation thereof, the process being presented in association with the recommendation directed to the improvement of the performance of the at least one component of the operation of the network presence of the one of the online merchants.

4. A system, comprising:
a server; and
a plurality of recommendations stored in a memory accessible by the server, the recommendations being applicable to improve an operation of a network presence of at least one of a plurality of online merchants, wherein a criteria is associated with each of the recommendations, each criteria determining whether a corresponding one of the recommendations applies to a network presence of a respective one of the online merchants;
an improvement engine implemented in the server, the improvement engine configured to:
  automatically determine a subset of the recommendations applicable to the network presence of one of the online merchants;
  determine an implementation status for each of the recommendations in the subset with respect to the network presence of the one of the online merchants; and
  present the subset of recommendations along with the implementation status of each of the recommendations to an agent of the one of the online merchants.

5. The system of claim 4, wherein the improvement engine is further configured to facilitate an implementation of one of the recommendations with respect to the network presence of the one of the online merchants.

6. The system of claim 4, wherein the improvement engine is further configured to track sales of at least one product offered through the network presence of the one of the online merchants relative to a time in which the one of the recommendations was implemented to determine an impact of the implementation of the one of the recommendations.

7. The system of claim 6, wherein the improvement engine is further configured to encode for presentation the sales of the at least one product relative to the time in which the one of the recommendations was implemented.

8. The system of claim 4, wherein the improvement engine is further configured to automatically implement at least one of the recommendations.

9. The system of claim 4, wherein the improvement engine is further configured to identify an additional product offering to incorporate into an existing product offering of the network presence of the one of the online merchants, wherein at least one of the recommendations presented recommends the additional product offering.

10. The system of claim 9, wherein the improvement engine is further configured to identify the additional product offering of the network presence of the one of the online merchants by applying commercial intelligence obtained from an aggregation of sales transaction data from the network presence of multiple ones of the online merchants to the additional product offering of the network presence of the one of the online merchants.

11. The system of claim 9, wherein the improvement engine determines the implementation status for each of the recommendations in the subset with respect to the network presence of the one of the online merchants by determining whether the improvement in the additional product offering has been implemented.

12. The system of claim 4, wherein the improvement engine is further configured to quantify a performance of at least one component of an operation of the network presence of the one of the online merchants relative to an network presence of a plurality of other ones of the online merchants, wherein the subset of recommendations includes a recommendation directed to an improvement of the performance of the at least one component of the operation of the network presence of the one of the online merchants.

13. The system of claim 12, wherein the at least one component of the operation of the network presence of the one of the online merchants comprises at least one of a conversion rate, a click-through rate, and a product view rate associated with at least one product offered for sale on the network presence of the one of the online merchants.

14. A method, comprising the steps of:
storing a plurality of recommendations in a memory accessible by a server, the recommendations being applicable to improve an operation of a network presence of at least one of a plurality of online merchants, wherein a criteria is associated with each of the recommendations, each criteria determining whether a corresponding one of the recommendations applies to a network presence of a respective one of the online merchants;
automatically determining, in the server, a subset of the recommendations applicable to the network presence of one of the online merchants;
determining, in the server, an implementation status for each of the recommendations in the subset with respect to the network presence of the one of the online merchants; and
presenting the subset recommendations along with the implementation status of each of the recommendations to an agent of the one of the online merchants.

15. The method of claim 14, further comprising the steps of:
conducting a survey relating to a performance of the network presence of at least one of the online merchants; and
presenting results from the survey to at least one of the online merchants.

16. The method of claim 15, wherein the results depict a measure of the performance of the network presence of the at least one of the online merchants to an average measure of the performance of other ones of the online merchants.

17. The method of claim 14, further comprising the step of facilitating an implementation of at least one of the recommendations with respect to the network presence of the one of the online merchants.

18. The method of claim 14, further comprising the step of tracking sales of at least one product through the network presence of the one of the online merchants relative to a time in which the one of the recommendations was implemented to determine an impact due to the implementation of the one of the recommendations.

19. The method of claim 18, further comprising the step of encoding for display the sales of the at least one product relative to the time in which the one of the recommendations was implemented.

20. The method of claim 14, further comprising the step of identifying an additional product offering to incorporate into an existing product offering of the network presence of the one of the online merchants, wherein at least one of the recommendations presented recommends the additional product offering.

21. The method of claim 20, wherein the step of identifying the additional product offering of the network presence of the one of the online merchants further comprises applying commercial intelligence obtained from an aggregation of sales transaction data from the network presence of multiple ones of the online merchants to the additional product offering of the network presence of the one of the online merchants.

22. The method of claim 20, wherein the step of determining the implementation status for each of the recommendations in the subset with respect to the network presence of the one of the online merchants further comprises determining whether the additional product offering has been implemented.

23. The method of claim 14, further comprising the step of quantifying a performance of at least one component of an operation of the network presence of the one of the online merchants relative to the network presence of a plurality of other ones of the online merchants, wherein the subset of recommendations includes a recommendation directed to an improvement of the performance of the at least one component of the operation of the network presence of the one of the online merchants.

24. The method of claim 23, further comprising the step of presenting a process to identify an improvement that may be applied to the network presence of the one of the online merchants to address the performance of the at least one component of the operation of the network presence of the one of the online merchants, the process being presented in association with the recommendation directed to the improvement of the performance of the at least one component of the operation of the network presence of the one of the online merchants.

25. The method of claim 23, wherein the step of quantifying the performance of the at least one component of the operation of the network presence of the one of the online merchants relative to the network presence of a plurality of other ones of the online merchants further comprises:
  quantifying the performance of the at least one component of the operation of the network presence of the one of the online merchants; and
  comparing the quantification of the performance of the at least one component of the operation of the network presence of the one of the online merchants with an average for the performance of the at least one component of the operation of the network presence of the other ones of the online merchants.

\* \* \* \* \*